No. 843,603. PATENTED FEB. 12, 1907.
C. S. HEMENWAY & F. M. THOMSON.
WIRE STRETCHER.
APPLICATION FILED OCT. 13, 1906.
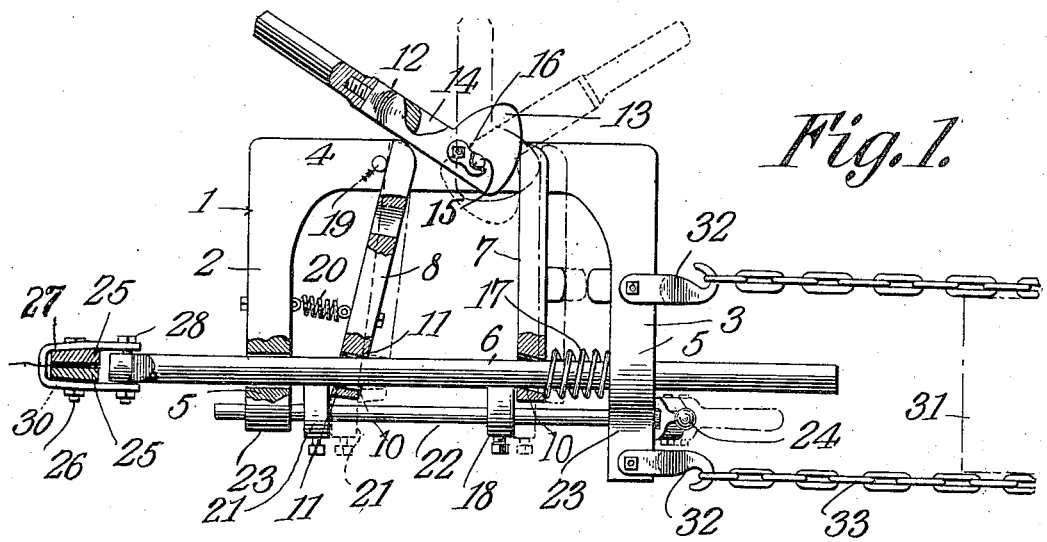
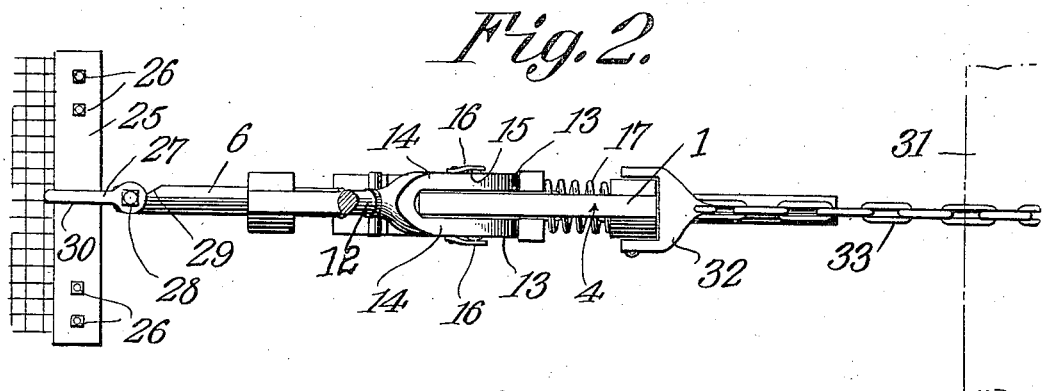
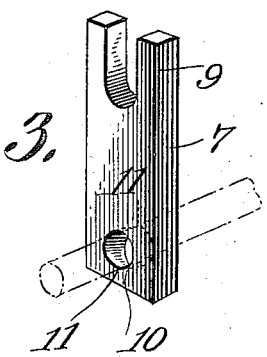
WITNESSES:
Charles S. Hemenway
Francis M. Thomson
INVENTORS
By
ATTORNEYS

UNITED STATES PATENT OFFICE.

CHARLES SIMON HEMENWAY AND FRANCIS MARION THOMSON, OF COVELO, CALIFORNIA.

WIRE-STRETCHER.

No. 843,603.　　　Specification of Letters Patent.　　　Patented Feb. 12, 1907.

Application filed October 13, 1906. Serial No. 338,839.

*To all whom it may concern:*

Be it known that we, CHARLES SIMON HEMENWAY and FRANCIS M. THOMSON, citizens of the United States, residing at Covelo, in the county of Mendocino and State of California, have invented a new and useful Wire-Stretcher, of which the following is a specification.

This invention relates to a stretching device adapted for use in stringing a line of wire, cable, wire fencing, and the like, and has for one of its objects to improve and simplify the construction and operation of this class of devices, so that a powerful draft will be effected in a ready and simple manner.

A further object of the invention is to provide a stretching device in which the draft or stretching member can be fed by a step-by-step movement, so that the desired tension can be produced with comparatively little effort on the part of the operator.

Another object of the invention resides in the employment of a simple actuating mechanism for the dogs of the step-by-step device, so that the active dog can be caused to operate on each stroke of the actuator or hand-lever of the apparatus.

A still further object is the provision of a simple, inexpensive, and convenient clamping device for attaching the wire or fencing to be strung to the draft element of the stretcher.

With these objects in view and others, as will appear as the nature of the invention is better understood, the invention comprises the various novel features of construction and arrangement of parts to be more fully described hereinafter and set forth with particularity in the claims appended hereto.

In the accompanying drawings, which illustrate one of the embodiments of the invention, Figure 1 is a plan view of the device in operation. Fig. 2 is a side view thereof. Fig. 3 is a perspective view of one of the dogs.

Corresponding parts in the several figures are indicated throughout by similar characters of reference.

Referring to the drawings, 1 designates the frame of the device, which preferably comprises an iron structure having arms 2 and 3 extending in the same direction from the body portion 4 and suitably spaced apart from each other. Adjacent the extremities of the arms each is provided with an opening 5, through which openings the draft or stretching element 6 of the device extends. The member 6 is preferably in the form of a straight rod of circular cross-section, so that it can be turned about its axis in the bearing-openings 5, and is preferably two or three feet in length, so that the device will have an ample range of operation. The draft member 6 is actuated in a longitudinal direction by means of the coacting dogs or pawls 7 and 8. Each dog comprises a short bar of metal of rectangular cross-section, as shown in Fig. 3, which is provided with bifurcations 9 at one end to span the body portion 4 of the frame and with an inclined aperture 10, through which the member 6 extends. The diagonal portions 11 of the edges of the aperture 10 serve as teeth for engaging or biting the draft member 6. The active dog 7 is operated by a double-acting operating-lever 12, which is provided with a double cam 13, that engages the end of the dog opposite from the draft member, so as to actuate the dog on both the forward and rear stroke of the lever. The lever 12 is bifurcated, so as to span the body portion 4 of the frame 1, and each bifurcation 14 is provided with a double cam 13, as clearly shown in Fig. 2. These cams 13 engage the bifurcations 9 of the active dogs.

The operating-lever is fulcrumed on the frame 1 by a pin 15, that is retained in position by keepers 16 on the lever engaging the ends thereof. The active dog 7 is recovered or returned to its initial position by a helical compression-spring 17, abutting at opposite ends the dog and arm 3 of the supporting-frame 1. The return movement of the dog is limited by a stop 18, arranged to engage the biting end thereof, as shown in Fig. 1. The back dog or pawl 8 serves to hold the draft device 6 stationary during the recovering movement of the active dog, so that the tension on the wire or fencing will not be lost. The bifurcated end of the back dog fulcrums on a pin or equivalent device 19, arranged on the body 4 of the frame, where the dog spans the said body. The dog 8 is drawn normally toward the arm 2 of the supporting-frame by an extension-spring 20, attached at its ends to the dog and to the arm 2. This spring holds the biting edges 11 in gripping relation to the member 6, so that movement of the said member toward the left is prevented. The spring 20 tends to prevent the dog 8 from moving toward the right under the movement of the draft member 6.

Coöperating with the dog 8 is a stop 21, which, like the stop 18, is adjustably mounted on a longitudinal movable rod 22, which is mounted in bearings 23 at the extremities of the arms 2 and 3. At one end of the stop-carrying rod or shaft 22 is a cam-lever 24, the cams of which engage with the arm 3. When the lever 24 is in the full-line position, the dogs are set for operation, and when it is in the broken-line position, the dogs are released, so that the draft device 6 can be freely adjusted in the frame, so that it may be readily attached to the clamping device holding the wire or fence to be stretched.

The clamping device, by which the lines of wire or wire fencing may be connected with the draft member 6, comprises a pair of bars 25, which grip between them the end of the wire fencing. Suitably-disposed bolts 26 pass through the bars or members 25, and by drawing on the nuts the fencing is tightly clamped. The clamping device is detachably connected with the draft member 6 by a clevis 27, passing around both of the members 25 at a medial point. The bolt 28 of the clevis engages in an undercut notch 29 in the end of the draft member 6. By this means the clamping device can be easily attached to or detached from the stretcher proper. As shown in Fig. 1, the arms of the clevis are slightly converged in the direction away from the stretcher, and the outer surfaces of the members 25 are provided with inclined recesses 30, in which the clevis engages. By this construction the tension on the members 25, due to the fencing, and the tension on the clevis, due to the draft member 6, cause the members to be wedged tighter and tighter in the clevis, so that the fencing is tightly gripped by the members 25 without the need of clamping-bolts in the vicinity of the clevis. Thus, as shown in Fig. 2, the clamping-bolts are arranged adjacent the ends of the members 25.

The frame 1 of the stretcher is adapted to be anchored to some immovable object—such, for instance, as an adjacent fence-post, which is indicated by the broken lines at 31. For this purpose the arm 3 of the frame 1 is provided with a plurality of hooks 32, to which are fastened the ends of the anchor-chain 33, that passes around the fence-post 31.

In operation the clamping device is applied to the fencing or wires to be stretched and the stretcher is anchored to a near-by fence-post, tree, or the like. The draft device and clevis are brought together and fastened. In order to do this, it may be necessary to move the draft device or member 6 longitudinally, so as to hook the bolt 28 of the clevis in the notch 29 of the member 6. To adjust the said member, the cam-lever 24 is thrown to the broken-line position, so as to cause the stop 18 to move the active dog 7 to the broken-line position. The dog is thus disengaged from the member 6, and then by taking the dog 8 in the hand and moving it to the broken-line position the members 6 can be moved in one direction or the other, so as to be brought into operative relation to the clamping device attached to the fencing. The cam-lever 24 is next returned to the full-line position and the stretcher is in condition for operation. The actuating-lever 12 is then worked back and forth by the operator, so as to move the draft member 6 to the right in a step-by-step manner. The actuating-cams 13 are so shaped that the dog 7 reaches the end of its working stroke by the time the lever 12 has been moved to the broken-line or mid position. As the lever is moved farther in the same direction to the dotted-line position the dog recovers its initial positions, so that it can be given another stroke during the return movement of the lever. It will thus be seen that a quick feed of the draft member 6 can be produced with practically no lost motion or backward movement of the said member.

We have described the principle of operation of the invention, together with the apparatus which we now consider to be the best embodiment thereof; but we desire to have it understood that the apparatus shown is merely illustrative and that various changes may be made, when desired, as are within the scope of the invention.

What is claimed is—

1. In a device of the class described, the combination of a supporting-frame, a draft member positively movable on the frame, an operating-lever, and means coöperating with the lever for gripping the draft member to move the latter during each stroke of the lever.

2. In a device of the class described, the combination of a supporting-frame, a longitudinally-movable draft member on the frame, a step-by-step mechanism for actuating the said member, a hand-operated means on the supporting-frame having a back-and-forth movement for actuating the said mechanism on each stroke, and means on the supporting-frame and arranged to operate on the said mechanism for rendering the same inoperative.

3. In a device of the character described, the combination of a supporting-frame, a longitudinally-movable draft member on the frame, a step-by-step mechanism for actuating the said member, an oscillating lever on the frame, and means on the lever arranged to actuate said mechanism during each stroke of the lever.

4. In a device of the class described, the combination of a supporting-frame, a draft member mounted thereon, a pair of dogs cooperating to move the member, a lever mounted on the frame for actuating one of the dogs, and a stop mechanism arranged on the frame for rendering the dogs operative and inoperative.

5. In a device of the class described, the combination of a supporting-frame having a pair of arms, a longitudinally-movable draft member mounted in the arms, dogs disposed between the arms and arranged to coact for actuating the said member, an elastic means between each dog and the adjacent arm of the frame for moving the dog, and a lever mounted on the frame and provided with a double cam arranged in operative relation to one of the dogs for actuating the latter during each forward and rearward movement of the lever.

6. In a device of the class described, the combination of a supporting-frame having a pair of arms, a longitudinally-movable draft member mounted in the arms, dogs disposed between the arms and arranged to coact for actuating the said member, an elastic means between each dog and the adjacent arm of the frame for moving the dog, a lever mounten on the frame in operative relation to one of the dogs, and adjustable stops carried by the said arms for engagement with the dogs.

7. In a device of the class described, the combination of a supporting-frame having a pair of arms, a longitudinally-movable draft member mounted in the arms, dogs disposed between the arms and arranged to coact for actuating the said member, an elastic means between each dog and the adjacent arm of the frame for moving the dog, a lever mounted on the frame in operative relation to one of the dogs, a longitudinally movable rod mounted on the arms, adjustable stops on the rods arranged in engagement with the dogs, and means for adjusting the said rod.

8. In a device of the class described, the combination of a supporting-frame having a body portion and arms extending therefrom, a longitudinally-movable draft member mounted in the arms, dogs arranged between the said arms and each having an opening through which the said member extends and a bifurcated portion spanning the said body of the frame, springs disposed between each dog and the adjacent arm, an operating-lever having a bifurcated portion spanning the body, cams on the bifurcations of the lever which engage the bifurcations of one of the dogs, and a stop device on the frame coöperating with the dogs.

9. In a device of the class described, the combination of a supporting-frame having a pair of arms, a longitudinally-movable draft member mounted in the arms, dogs disposed between the arms and arranged to coact for actuating the said member, an elastic means between each dog and the adjacent arm of the frame for moving the dog, a lever mounted on the frame and provided with a double cam arranged in operative relation to one of the dogs for actuating the latter on each stroke of the lever, and an anchor means attached to one of the arms.

In testimony that we claim the foregoing as our own we have hereto affixed our signatures in the presence of two witnesses

CHARLES SIMON HEMINWAY.
FRANCIS MARION THOMSON.

Witnesses:
  G. W. CUMMINS,
  R. W. EVERETT.